United States Patent [19]
Boers

[11] Patent Number: 5,152,109
[45] Date of Patent: Oct. 6, 1992

[54] PORTABLE PERFORMANCE PLATFORM

[75] Inventor: Arie Boers, Plymouth, Minn.

[73] Assignee: Wenger Corporation, Owatonna, Minn.

[21] Appl. No.: 595,471

[22] Filed: Oct. 11, 1990

[51] Int. Cl.⁵ .............................................. E04H 3/10
[52] U.S. Cl. ........................................ 52/143; 52/6;
52/66; 52/71; 52/79.5
[58] Field of Search ................... 52/7, 143, 66, 68, 69,
52/71, 79.5, 6; 181/287

[56] References Cited

U.S. PATENT DOCUMENTS

| | | | |
|---|---|---|---|
| 1,521,803 | 1/1925 | Dossenbach | 296/1.1 |
| 2,755,517 | 7/1956 | Sickel | 52/143 |
| 3,181,203 | 5/1965 | Wenger | 52/64 |
| 3,217,366 | 11/1965 | Wenger | 52/69 |
| 3,258,884 | 7/1966 | Wenger | 52/65 |
| 3,620,564 | 11/1971 | Wenger | 296/175 |
| 4,232,488 | 11/1980 | Hanley | 52/7 |
| 4,660,332 | 4/1987 | Colvin, Jr. | 52/79.5 |
| 4,720,945 | 1/1988 | Berranger et al. | 52/143 |

Primary Examiner—Michael Safavi
Attorney, Agent, or Firm—Dorsey & Whitney

[57] ABSTRACT

A portable performance platform for the performing arts includes a wheel mounted chassis adapted for towing by an automobile or truck. A staging compartment is mounted on the chassis that includes front and rear end walls, opposed sidewalls, an overhead roof, and a compartment floor. Opposed telescoping towers are mounted on the front and rear ends of the chassis to provide right and left upright supports for the overhead roof. The compartment sidewalls are pivotally carried along opposed side margins of the roof, and are outwardly extendible to present an extended canopy in conjunction with the roof when the platform is set up in its performance configuration. A unique actuating assembly raises and lowers the sidewalls in tandem, and tilts the raised canopy to an acoustically desirable orientation. In the performing configuration, the platform aprons of the portable performance platform are pivoted downwardly so as to be flush with the compartment floor. The forward apron is articulated to present an enlarged stage platform in the extended position and includes a unique apron actuating assembly for raising and lowering the platform between performance and stowed configurations.

4 Claims, 6 Drawing Sheets

Fig. 8

PORTABLE PERFORMANCE PLATFORM

TECHNICAL FIELD

This invention relates to mobile stage structures suitable for transportation along roads and highways. In particular, it pertains to a portable performance platform for the performing arts that, in its stowed configuration, can be transported along roads and highways by an automobile or truck, and which can be unfolded when it reaches it destination to present an extended performing area having an overhead canopy.

BACKGROUND ART

Portable staging structures that can be transported over the highway from one performing area to another are known. U.S. Pat. No. 3,620,564 owned by the assignee of this application discloses a self-propelled portable stage wherein one or both sidewalls of a chassis mounted staging compartment can be raised to provide an overhead canopy. With the sidewall raised, a staging apron can be pivoted downwardly underneath the canopy. Support arms extend from the canopy downwardly and inwardly to the unraised portion of the near vehicle sidewall to support the canopy in its raised position. Other examples of portable performance platforms are disclosed in U.S. Pat. Nos. 3,258,884, 3,217,366, 3,181,203, and 1,521,803.

Canopies positioned over performance platforms are preferably tilted upwardly and outwardly towards the audience for proper acoustic projection. While previous portable performance platforms have allowed for the upward tilt of a portion of the canopy, a mechanically efficient means for tilting the entire canopy of a portable platform in the proper orientation has been lacking. A portable performance platform that could be folded into a stowed configuration suitable for transportation along roads and highways that included an overhead canopy that could be tilted in its entirety outwardly and upwardly towards a performing area in a mechanically efficient manner would provide a decided advantage.

SUMMARY OF THE INVENTION

The portable performance platform in accordance with the present invention includes a wheel mounted chassis adapted for towing by an automobile or truck. A staging compartment is mounted on the chassis that includes front and rear end walls, opposed sidewalls, an overhead roof, and a compartment floor. Opposed platform aprons are pivotally mounted along respective side margins of the chassis. Opposed telescoping towers are mounted on the front and rear ends of the chassis to provide right and left upright supports for the overhead roof.

The compartment sidewalls are pivotally carried along opposed side margins of the roof, and are outwardly extendible to present an extended canopy in conjunction with the roof when the platform is set up in its performance configuration. A unique actuating assembly raises and lowers the sidewalls in tandem, and tilts the raised canopy to an acoustically desirable orientation. In the performing configuration, the platform aprons of the portable performance platform are pivoted downwardly so as to be flush with the compartment floor. The forward apron is articulated to present an enlarged stage platform in the extended position and includes a unique apron actuating assembly for raising and lowering the platform between performance and stowed configurations.

DETAILED DESCRIPTION OF THE DRAWINGS

Referring to the drawings, a portable performance platform 10 in accordance with the present invention broadly includes chassis 12 supported by ground engaging wheels 14, and a staging compartment 16 carried by the chassis 12. Trailer hitch 18 is fixedly attached to the chassis 12 for towing attachment of the platform 10 to a towing vehicle (not shown).

Figures 1, 3:
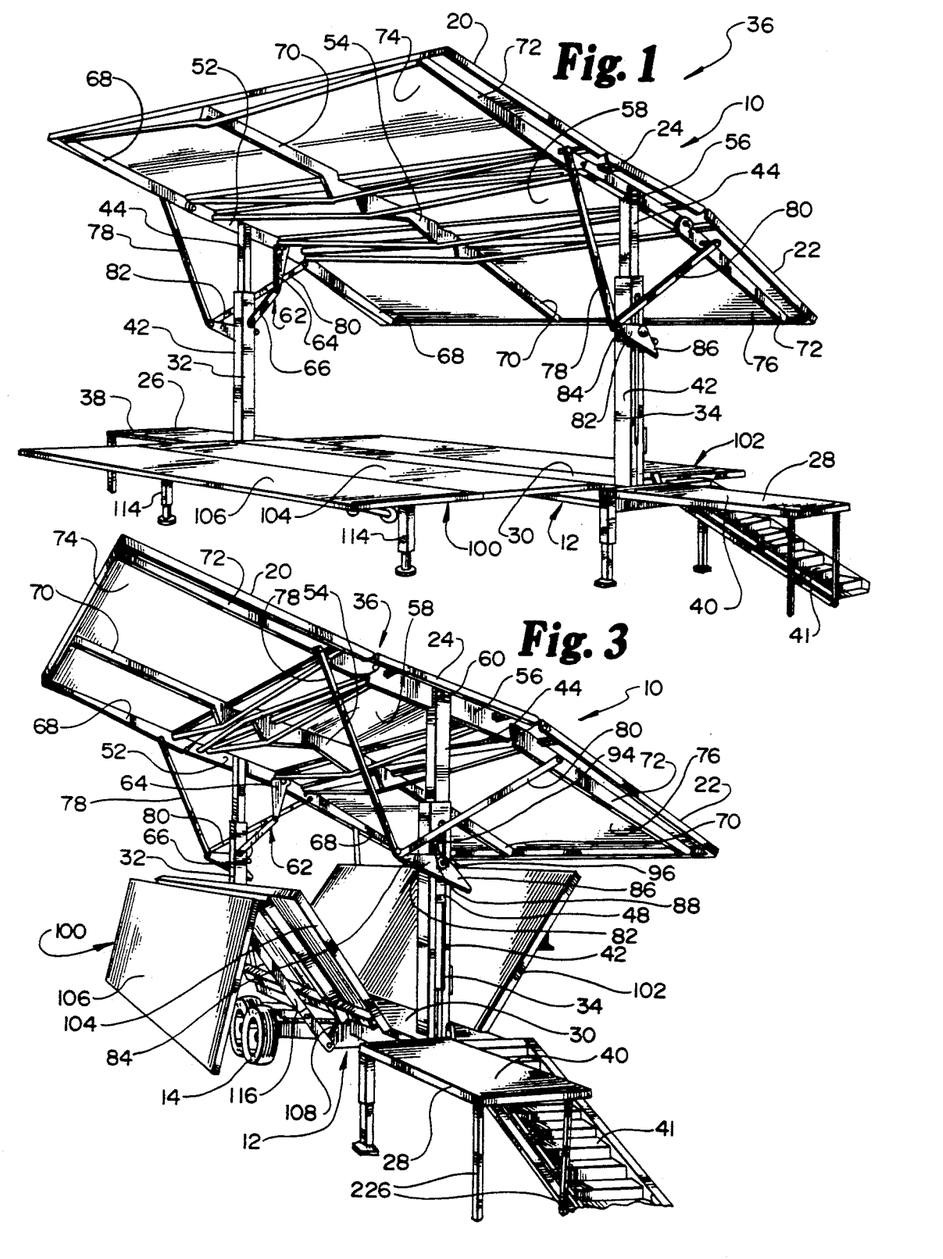
FIG. 1 is a perspective view of the performance platform in accordance with the present invention depicted in the performance configuration.
FIG. 3 is a perspective view of the invention with the canopy in the performance configuration and the platform aprons depicted in a partially folded configuration.
Figure 6:
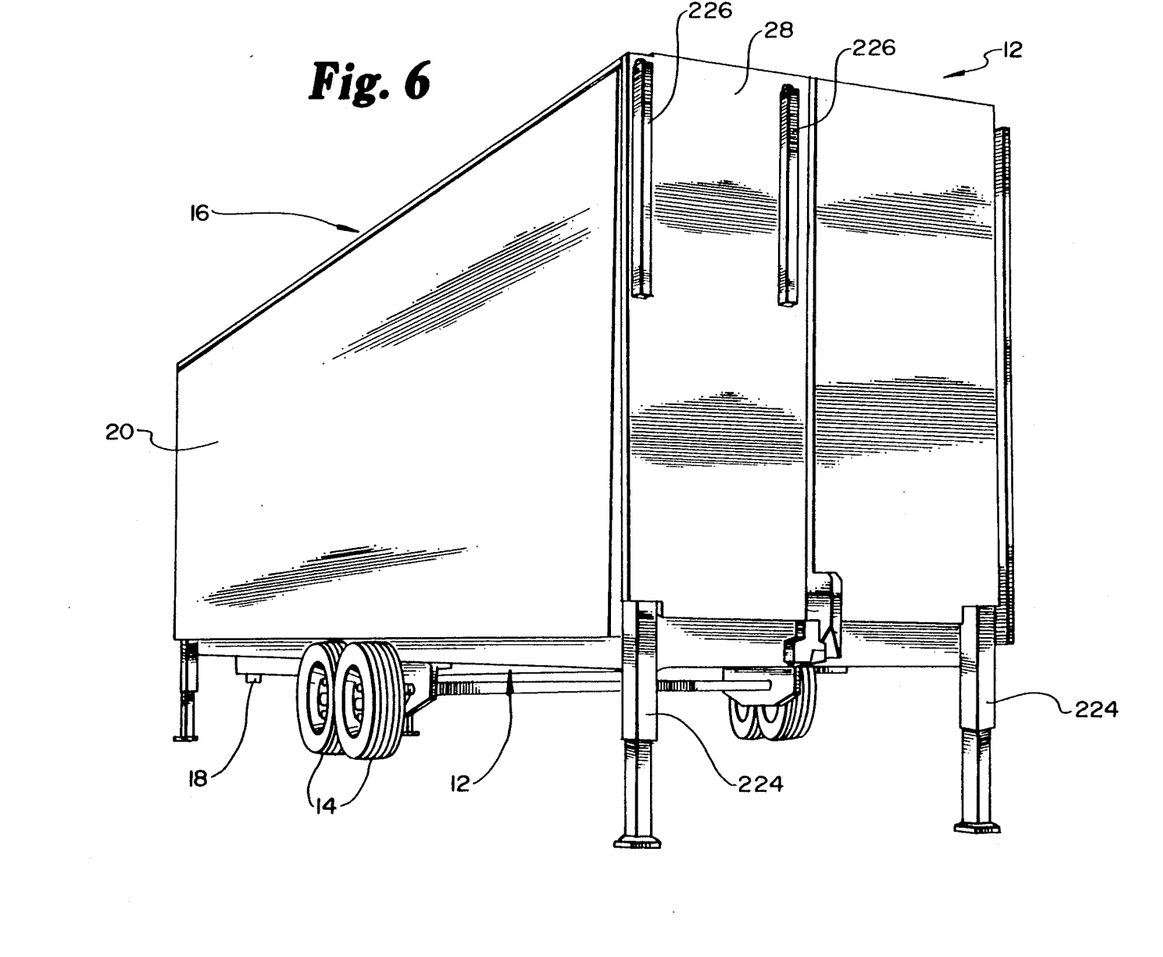
FIG. 6 is a perspective view of the invention in the fully stowed configuration prior to retracting the main support legs.

The performance platform 10 is depicted in its stowed configuration in FIG. 6, and in its fully set up performance configuration in FIG. 1. In its stowed configuration, the staging compartment 16 includes spaced side panels 20, 22 that provide front and rear canopy members when in the performance configuration, roof 24, front and rear end walls 26, 28, and center stage panel 30. Opposed telescoping towers 32, 34 are carried at the front and rear of the chassis 12 to provide right and left support members for the roof 24. Referring to FIG. 1, it will be seen that, in the performance configuration, the roof 24 and side panels 20, 22 cooperate to present an overhead canopy 36. The front end wall 26 pivots downwardly to provide a right wing stage panel 38. The rear end wall 28 pivots downwardly to provide a left wing stage panel 40 and a stairway 41.

Figure 2:
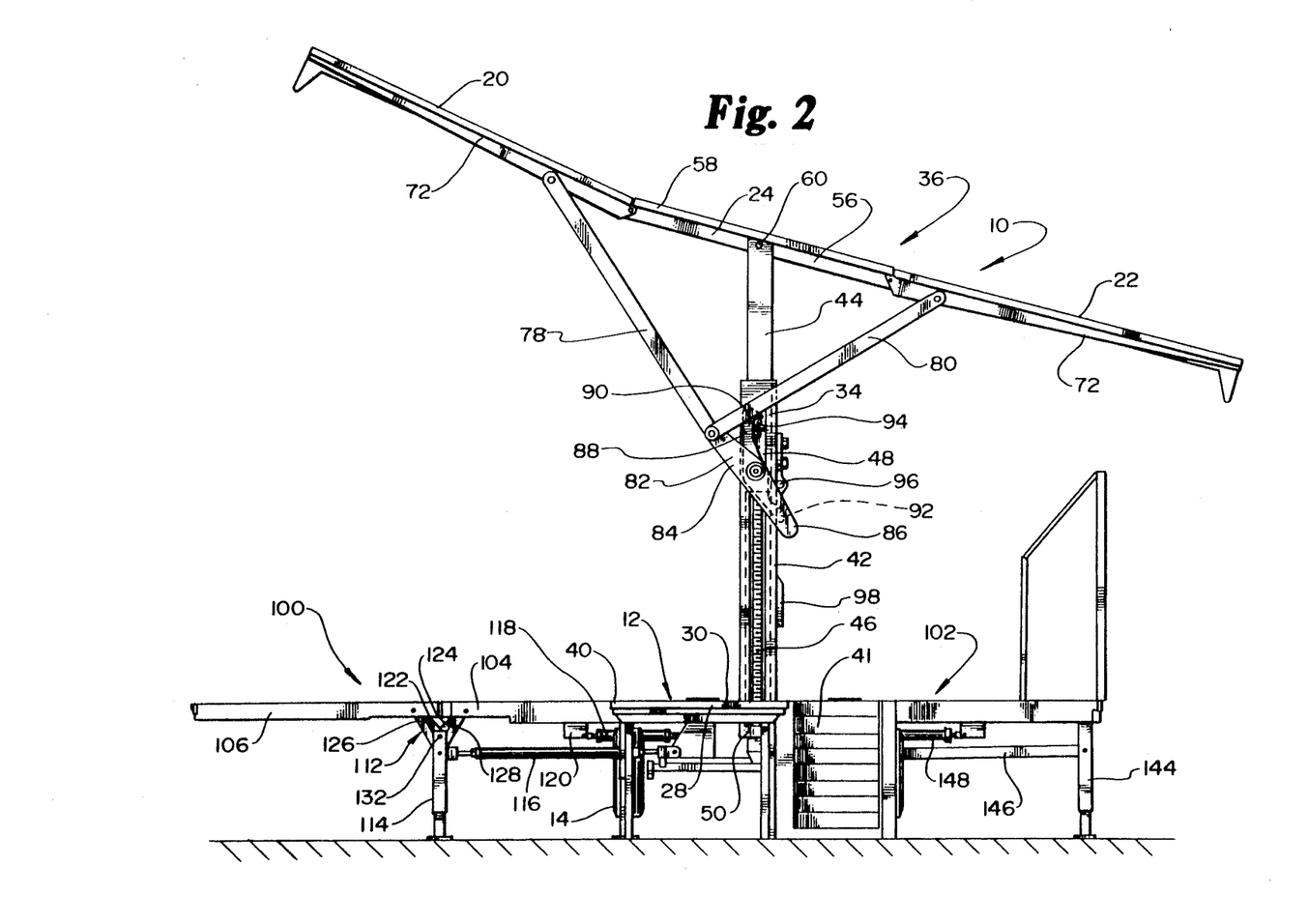
FIG. 2 is a left side elevational view of the invention depicted in the performance configuration.

Each telescoping tower 32, 34 includes a generally tubular, upright standard 42 and a column 44 slidably received within the standard 42. Referring in particular to FIG. 2, a threaded lead screw 46 extends internally along the length of the standard 42. A cam carrying block 48, abutably engageable with column 44, is threadably carried by the lead screw 46 for downward and upward travel within the standard 42. The lead screws 46 are connected by a transmission assembly (not shown) to a drive motor 50 for rotation of the lead screws 46.

The roof 24 includes right, center and left support bars 52, 54, 56, supporting a cover sheet 58. The right and left support bars 52, 56 are pivotally attached to the top end of a respective column 44 by center pivot pins 60. Stabilizing assembly 62, including downwardly extending stabilizing arm 64 and stabilizing lever 66, extends between the right support bar 52 and the standard 42 of front telescoping tower 32. The stabilizing lever 66 is pivotally connected at its opposed ends to the stabilizing arm 64 and the front tower standard 42.

Each of the panels 20, 22 include right, center and left support members 68, 70, 72, supporting respective cover sheets 74, 76. Forward and rear canopy support struts 78, 80 are pivotally carried by respective right and left panel support members 68, 72.

Cam lever 82 is pivotally carried by cam carrying block 48. The cam lever 82 includes lever arm 84 and opposed actuating arm 86. The forward and rear canopy struts 78, 80 of each side of the platform 10 are pivotally coupled together at their ends opposite the ends pivotally coupled to the front and rear canopy members 20, 22, at the distal end of lever arm 84 of cam lever 82.

A column engaging latch 88 is also pivotally carried by the cam carrying block 48. The latch 88 includes latch arm 90 and opposed latch follower 92. Latch arm engageable latch pin 94 is carried at the lower end of column 44. Cam actuator boss 96 and latch disengagement ramp 98 are carried by the upright tower standard 42 of each telescoping tower 32, 34.

Front and rear aprons 100, 102 are pivotally carried by the opposed side margins of center stage panel 30. The front apron 100 includes main stage panel 104 and outer panel 106. The main stage panel 104 is pivotally coupled to the center stage panel 30 by pivot hinges 108 carried by chassis gussets 110. The outer panel 106 is pivotally coupled to the main stage panel 104 by a pair of right and left scissor hinge assemblies 112 (only one assembly 112 being depicted in the drawings). Stage support legs 114 are also carried by the scissor hinge assemblies 112. A connecting link 116 extends from each support leg 114 to its respective chassis gusset 110. Actuating ram 118 extends between the chassis 12 and an ear 120 carried by the main stage panel 104.

Scissor hinge assemblies 112 each include a pair of upper links 122, 124 and a pair of lower links 126, 128. The upper links 122, 124 are pivotally held at their first ends 130 about a first pivot pin 132 carried at the top of stage leg 114. The first ends 134 of the lower links 126, 128 are pivotally coupled together about a pivot pin 135 carried in a slot 136 of stage leg 114. The second end 138 of each upper link 122, 124 is pivotally coupled to the second end 140 of a respective lower link 126, 128.

Rear apron 102 is pivotally coupled to center stage panel 30 by rear apron hinges 142. Back stage support legs 144 are pivotally carried by the rear apron 102. A connecting link 146 extends between each rear apron support leg 144 to the chassis 12. Actuating ram 148 extends between the chassis 12 and an ear 150 carried by the rear apron 102. Optional backdrops 149 may be carried by the rear apron 102.

Figure 8:
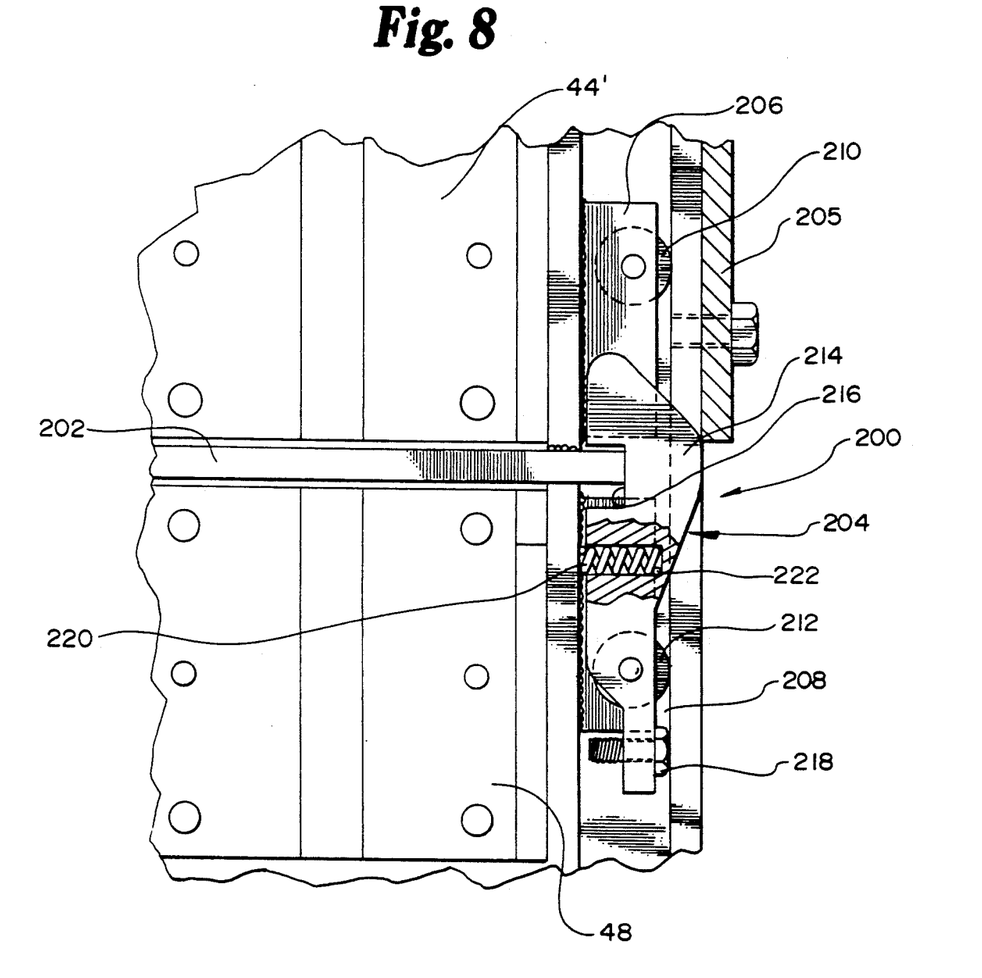
FIG. 8 is an enlarged, fragmentary, detailed view depicting an alternate configuration for the telescoping tower latching mechanism.

An alternate embodiment of the latch assembly 200 for selectively interconnecting a column 44' of telescoping towers 32, 34 and cam carrying block 48 is depicted in FIG. 8. The latch assembly 200 includes a strike plate 202 fixedly carried by the column 44', latch lever assembly 204 carried by the cam carrying block 48, and latch actuator bar 205.

Referring to FIG. 8, an upper roller mount 206 is carried by the column 44', and a lower roller mount 208 is carried by the cam carrying block 48. Upper and lower rollers 210, 212 are carried by the upper roller mount 206 and lower roller mount 208 respectively.

Latch lever assembly 204 includes a latch lever 214 pivotally carried by the lower roller mount 208. Latch lever 214 includes strike plate engaging lever notch 216 at one end thereof, and adjustable jam nut 218 at the opposite end thereof. Biasing spring 220 is received within spring cavity 222 of the latch lever 214.

Referring to FIG. 6, main retractable support legs 224 are carried at each of the four corners of chassis 12. Drop legs 226 are hingeably carried by the front and rear end walls 26, 28.

In operation, the portable performance plaform 10 can be transported over the road when collapsed into its stowed configuration. In particular, and referring to FIG. 6, the portable performance platform 10 is in its fully stowed configuration when the retractable main support legs 224 depicted as being extended as in FIG. 6 are fully retracted. Upon arrival at a performance site, the main support legs 224 are extended so as to lift the ground engaging wheels 14 off of the ground, thereby stabilizing the performance platform 10 in a fixed position.

Figures 4, 5:
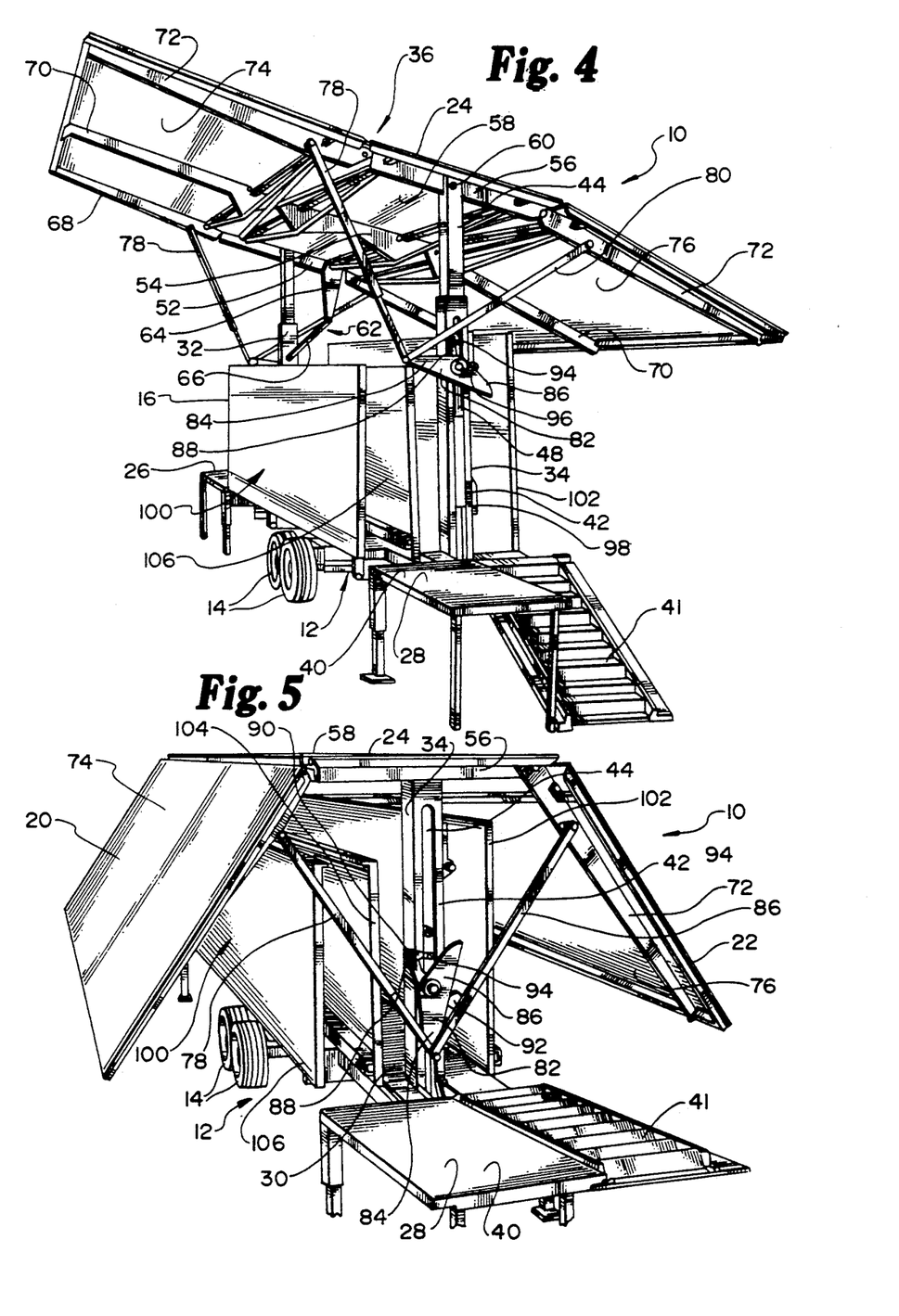
FIG. 4 is a perspective view of the invention with the canopy in the performance configuration, and the front and rear platform aprons depicted in the stowed configuration.
FIG. 5 is a perspective view of the invention with the front and rear platform aprons in the fully stowed position and the canopy depicted in a partially stowed configuration.

The operation of extending the performance platform 10 from its stowed configuration to a performance configuration can best be understood by viewing the sequence presented in the order of FIG. 5, FIG. 4, FIG. 3, and FIGS. 1 and 2. Referring to FIG. 5, the first step in deploying the performance platform 10 in its performance configuration is to rotate threaded lead screw 46 such that cam carrying blocks 48 are urged upwardly within the tower standard 42 of telescoping towers 32, 34. It will be seen from FIG. 5 that, as the cam carrying blocks 48 are raised, the canopy support struts 78, 80 urge the forward and rear canopies 20, 22 upwardly. It will also be seen that the roof 24 has not been urged upwardly, in the configuration of FIG. 5, since the cam carrying blocks 48 are not far enough upwardly within tower standards 42 to engage the bottom of columns 44. It will also be seen in FIG. 5 that the rear panel 34 has been pivoted downwardly to present wing stage 40 and staircase 41.

Referring to FIG. 4, it will be seen that, as as the cam carrying blocks 48 continue upwardly within upright standards 42, the actuating arms 86 of cam levers 82 engage the cam actuating boss 96 carried by the standards 42. The cam lever 82 is accordingly rotated clockwise, from the perspective of FIG. 4, rotating the distal end of the lever arm 84 of cam lever 82 away from the center line of the telescoping tower 34. As a result, the forward canopy 20 and rear canopy 22 are oriented at different inclines through the connecting linkages of forward and rear struts 78, 80. Moreover, the roof 24 is tilted clockwise, from the perspective of FIG. 4, and tension is placed on the stabilizing assembly 62 so as to provide added support to the deployed roof 24.

Figure 7:
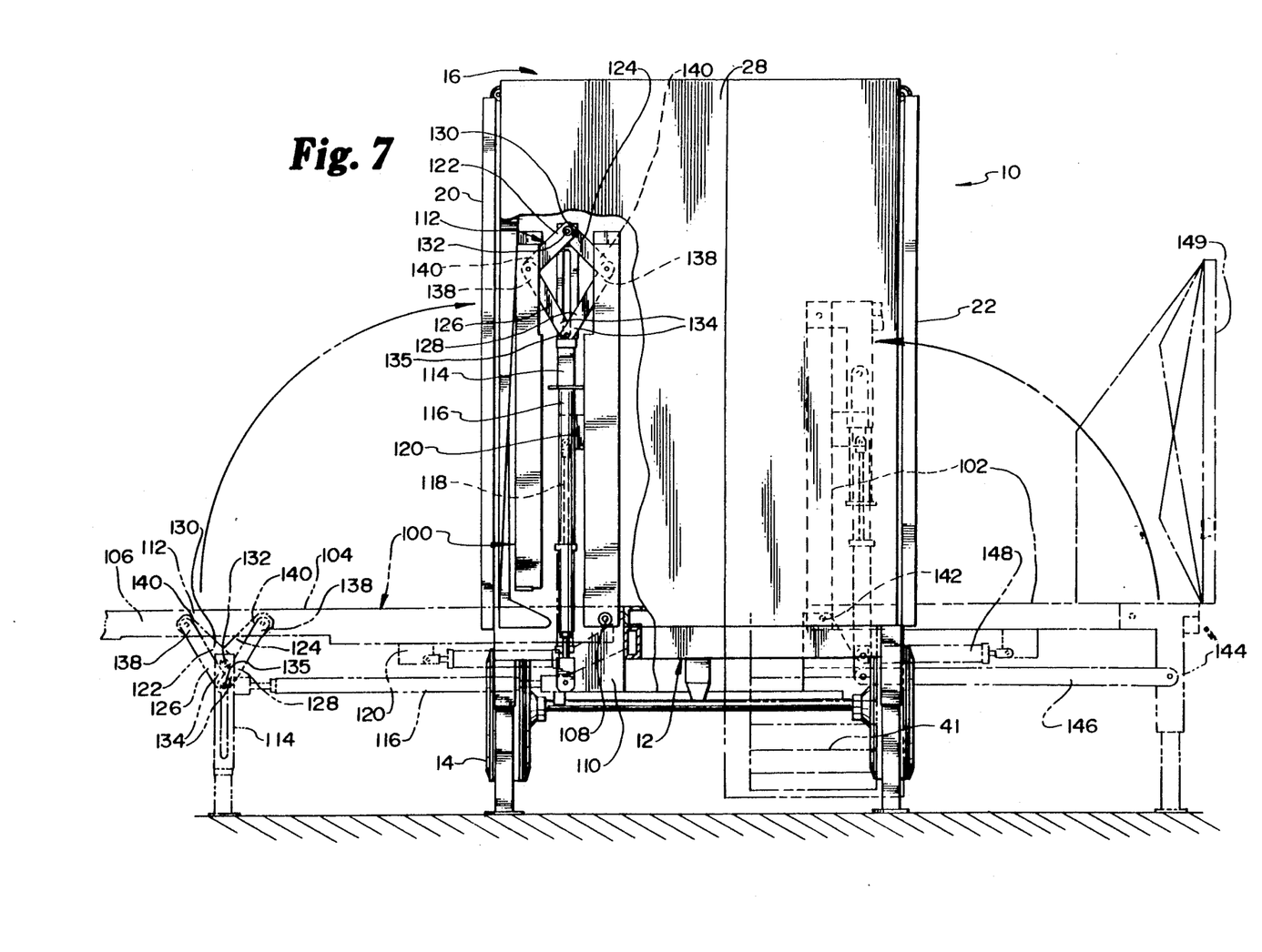
FIG. 7 is a rear elevational view of the invention with parts cut away for clarity, and with the front and rear platform aprons depicted in phantom lines in their performance configuration.

Referring to FIG. 3, and with the overhead canopy 36 fully extended, the front and rear aprons 100, 102 can be deployed to the performance configuration. In particular, and with reference to FIG. 7 as well as FIG. 3, actuating ram 118 is retracted, thereby rotating the main stage panel 104 downwardly about hinge pins 108. As the main stage panel 104 of front apron 100 is rotated downwardly, the connection between the chassis 12 and the stage leg 14 provided by connecting link 116 causes the scissor hinge assembly 112 to change its configuration from that shown in solid line in FIG. 7 to that shown in phantom line in FIG. 7. The panel 106 is accordingly rotated upwardly relative to the main stage panel 104 into the position depicted in phantom lines in FIG. 7. The performance platform 10, in its fully deployed performance configuration, is depicted in FIGS. 1 and 2.

Retraction of the performance platform from its fully deployed configuration depicted in FIG. 1 to the stowed position depicted in FIG. 6 is accomplished by reversing the above steps. It will be noted, from viewing FIG. 5 and FIG. 4, that the latch arm 90 of column engaging latch 88 engages the latch hook 94 at the base of column 44 as the cam carrying block 48 moves upwardly within the tower standard 42. When the cam carrying block 48 is moved downwardly within the standard 42, by rotating the threaded lead screw 46 in the appropriate direction, the engagement of the latch arm 90 with the latch hook 94 positively retracts the column 44 downwardly through the standard 42. As the cam carrying block 48 descends downwardly, the latch follower 92 of the column engaging latch 88 engages the latch disengagement ramp 98. The column engaging latch 88 is thereby rotated counterclockwise, as seen from the perspectives of FIGS. 4 and 5, thereby disengaging the latch arm 90 from the latch hook 94. The cam carrying block 48 continues to descend, independently of the column 42 and the roof 24, pulling the panels 20, 22 into their stowed position.

Referring to FIG. 8, the alternate embodiment of the latch assembly 200 operates to engage and positively retract the column 44' downwardly through the standard 42. In particular, the lever notch 216 engages the strike plate 202 fixedly carried by the column 44', until the latch lever 214 is lowered below the latch actuator bar 205. At that point, biasing spring 220 urges the lever 214 clockwise, from the perspective of FIG. 8, such that the lever 214 disengages from the column 44'. It will bed appreciated that during raising of the cam carrying block 48, the lever 214 engages latch actutator bar 205 thereby being urged into engagement with the strike plate 202. Jam nut 218 can be adjusted to control the point at which the upper coamming surface of the lever 214 actually engages the actuator bar 205 to accomodate for uneven wear of the cam surface.

I Claim:

1. A portable platform for the performing arts or the like, comprising:

a chassis having ground engaging wheels for overland transportation of said platform;

a staging compartment operably carried by said chassis including a roof panel, a pair of opposed side panels hinged to said roof panel and a main stage panel hinged to said chassis;

means operably coupled to said roof panel and said side panels for selectively reconfiguring said roof and side panels between a stowed configuration suitable for overland transportation wherein said roof panel is disposed in a horizontal plane and said side panels are disposed in spaced parallel vertical planes and a performance configuration wherein said roof and side panels cooperate to present a canopy directed upwardly and outwardly toward a performance area to one side of said chassis; and means operably coupled to said main stage panels for selectively reconfiguring said main stage panel between a vertically disposed stowed configuration suitable for overland transportation and a horizontally disposed performance configuration wherein said main stage panel is disposed horizontally to present a stage floor.

2. The portable platform of claim 1, wherein said means for reconfiguring said roof and said side panels comprises:

a pair of columns extending vertically from said chassis and supporting said roof panel at each end thereof, respectively;

a cam lever mounted on each column for pivotal and slidable movement;

a pair of struts pivotally attached to said respective side panels at each end thereof and extending to a common point on said cam lever;

means for sliding each said cam lever up and down along the axis of said column in unison; and a boss on each column disposed for engagement with said cam lever at its upward limit of travel to cause said cam lever to pivot, thereby causing said side panels to pivot from said stowed configuration to said performance configuration.

3. The portable platform of claim 2 wherein said cam lever is mounted for pivotal and slidable movement on a block slidable along the axis of said columns.

4. The portable platform of claim 3, wherein said means for sliding each said cam lever up and down along the axis of each column comprises:

a threaded member axially disposed in said column and threadably connected to said block, and means for axially rotating said threaded member to thereby slide said block and cam lever up and down each said column.

* * * * *

UNITED STATES PATENT AND TRADEMARK OFFICE
CERTIFICATE OF CORRECTION

PATENT NO. : 5,152,109

DATED : October 6, 1992

INVENTOR(S) : Arie Boers

It is certified that error appears in the above-identified patent and that said Letters Patent is hereby corrected as shown below:

Column 4, line 46, the second "as" should be deleted.

Column 5, line 40, delete the word "bed" and substitute therefor --be --.

Column 5, line 44, delete the word "coamming" and substitute therefor -- camming --.

Column 5, lines 45-46, delete the word "accomodate" and substitute therefor -- accommodate --.

Signed and Sealed this

Twenty-third Day of November, 1993

Attest:

BRUCE LEHMAN

*Attesting Officer*   Commissioner of Patents and Trademarks